US006782176B1

(12) United States Patent
Greer

(10) Patent No.: US 6,782,176 B1
(45) Date of Patent: Aug. 24, 2004

(54) COLORED RADIATION CURABLE COATING COMPOSITIONS FOR IDENTIFYING TELECOMMUNICATIONS ELEMENTS AND TELECOMMUNICATIONS ELEMENTS COATED THEREBY

(76) Inventor: Robert W. Greer, 1342 Pear Dr., Conover, NC (US) 28613

(*) Notice: Subject to any disclaimer, the term of this patent is extended or adjusted under 35 U.S.C. 154(b) by 0 days.

(21) Appl. No.: 09/360,951

(22) Filed: Jul. 27, 1999

(51) Int. Cl.[7] ................................................. G02B 6/02
(52) U.S. Cl. ...................................................... 385/128
(58) Field of Search ................................... 385/123–128

(56) References Cited

U.S. PATENT DOCUMENTS

| | | | |
|---|---|---|---|
| 3,157,633 A | | 11/1964 | Kuhn |
| 4,629,285 A | | 12/1986 | Carter et al. |
| 4,846,846 A | | 7/1989 | Rekers et al. |
| 5,074,643 A | * | 12/1991 | Petisce ...................... 385/128 |
| 5,146,531 A | | 9/1992 | Shustack ................... 385/128 |
| 5,259,060 A | | 11/1993 | Edward et al. |
| 6,001,936 A | | 12/1999 | Barrera et al. .............. 525/454 |
| 6,240,230 B1 | * | 5/2001 | Szum ......................... 385/128 |
| 6,298,189 B1 | * | 10/2001 | Szum et al. ................ 385/128 |

FOREIGN PATENT DOCUMENTS

| | | |
|---|---|---|
| EP | 0 205 291 | 12/1986 |
| EP | 0348024 A3 | 12/1989 |
| EP | 0 432 931 A1 | 6/1991 |
| EP | 0614099 A3 | 9/1994 |
| JP | 4057817 A | 2/1992 |
| WO | WO 9611965 A1 | 4/1996 |
| WO | WO 98/50317 | 11/1998 |
| WO | WO 9938043 A1 | 7/1999 |
| WO | WO 99/61535 | 12/1999 |
| WO | WO 01/09053 A1 | 2/2001 |

OTHER PUBLICATIONS

Provisional U.S. application 60/146,525 filed Jul. 30, 1999.
Huei–Hsiung Wang, Iou–Shan Tzun. "Modified Polyurethane with a Covalent Bond of Dye Molecule" Journal of Applied Polymer Science, vol. 73, pp. 245–253, 1999.
G.V. Maksimova, et al. "Interaction of Epoxy–Containing Organosilicon Compounds with Anthraquinone Dyes", Polymer Science, Ser. B, vol. 37, Nos. 3–4, 1995, pp. 143–145.
Gexing Shen, et al., "UV–Curable, Special Coding Inks for Optical Fibers", Journal of Coatings Technology, vol. 17, No. 894, Jul. 1999, pp. 69–72.
World Office Abstract, WO 9425665; "Radiation–Induced Fixation of Dyes" Nov. 10, 1994, Page Number not Available.

* cited by examiner

Primary Examiner—Frank G. Font
Assistant Examiner—Amanda Merlino
(74) Attorney, Agent, or Firm—Sughrue Mion, PLLC

(57) ABSTRACT

A telecommunication element having a durable color identifying polymeric coating thereon is disclosed. The telecommunication element comprises an elongated communication transmission medium, such as an optical fiber or an optical fiber ribbon, and a radiation cured polymeric coating having an identifying color applied on at least a portion of the transmission medium. The identifying color in the polymeric coating is provided by chromophore molecules that are covalently bonded thereto. Coating compositions and a method are also disclosed.

15 Claims, 1 Drawing Sheet

COLORED RADIATION CURABLE COATING COMPOSITIONS FOR IDENTIFYING TELECOMMUNICATIONS ELEMENTS AND TELECOMMUNICATIONS ELEMENTS COATED THEREBY

BACKGROUND OF THE INVENTION

1. Field of the Invention

The present invention generally relates to radiation curable coatings for telecommunications elements such as optical fibers and optical fiber ribbons. More particularly, the present invention relates to colored radiation curable coating compositions for producing cured coatings on the telecommunications element having an identifying color provided by dye molecules which are covalently bonded to the cured coating.

2. Description of Related Art

For many years now, optical fibers have been used as a reliable transmission medium in telecommunications cables. Typically, an optical fiber comprises a core, a cladding and one or more coatings applied over the cladding. One purpose of the coatings is to protect the surface of the optical fiber from mechanical scratches and abrasions typically caused by subsequent handling and use. Another purpose of the coatings is to protect the glass from exposure to moisture. The coating or coatings may also have some influence over the fibers optical characteristics because the coatings are physically responsive to external mechanical forces and temperature. The coating compositions applied to the optical fiber are typically liquid, radiation curable compositions. Typically, the coating compositions are cured on the optical fiber by exposing the coating composition to ultraviolet radiation, electron beam radiation or ionizing radiation for a predetermined period of time deemed suitable for effective curing.

Telecommunications cables containing optical fibers come in a variety of configurations. In some cables, the optical fibers are held loosely inside a buffer tube. In other cables, the optical fibers are arranged in a planar array to form an optical fiber ribbon. The planar array is typically encapsulated by one or more radiation curable matrix material layers. The radiation curable matrix layers are cured by exposing the matrix material to ultraviolet radiation, electron beam radiation, ionizing radiation or infrared radiation for a predetermined period of time deemed suitable for effective curing.

In a telecommunications cable containing multiple optical fibers, the optical fibers may be distinguished from each other by the use of a color coating layer which has been applied over a coated optical fiber. Colors in the color coating layer are usually obtained by dispersing colored pigment particles in a suitable liquid carrier and applying the liquid carrier over the coating. Unfortunately, the use of pigment particles to provide color in color coatings for optical fibers has presented manufacturing and performance problems. For example, the pigment particles and the liquid carrier tend to gradually separate into two distinct phases. As a result, pigmented color coatings have a relatively short shelf life. In addition, the phase separation in a pigmented coloring system is further complicated by concurrent agglomeration of pigment particles. Undesirably, the presence of pigment particle agglomerates in a color coating on a coated optical fiber can induce micro-bending which results in transmission losses. Typically, a relatively high concentration of pigment material is required to achieve an opaque ultraviolet radiation curable color coating. Unfortunately, the required high concentration inhibits the transmission of incident ultraviolet radiation which is necessary to cure the color coating material because the pigments refract, reflect and scatter the incident radiation. The inhibition of the ultraviolet radiation results in a reduction in processing speed of the optical fiber along a manufacturing line and thereby increases production costs. Also, the slow cure speed of pigmented color coatings causes the processing and the cure of these materials to be sensitive to minor changes in the thickness of the color coatings.

The use of dyes to provide color in color coatings has been considered as an alternative to pigment-based color coatings. Dyes have the advantage over pigments of faster curing because the dyes do not scatter the curing radiation, although some dyes may absorb light which could slow curing. However, dyes are generally not preferred because they diffuse (bleed) out into common cable filling compounds resulting in a color loss. In an effort to reduce the bleeding, U.S. Pat. No. 5,074,643 teaches the use of a polymeric dye in a color coating. The polymeric dyes are macromolecular chromophore containing molecules which are entrapped in the cross linked coating network. While the entrapment results in a slowing of the bleeding process, the dyes nevertheless still bleed. Over time, even with the entrapped polymeric dyes, the color imparted to the fibers is likely to be lost and if the color is lost from the fibers, then identification of each of the fibers becomes extremely difficult and time consuming in the field during fiber splicing.

If a telecommunications cable has many optical fiber ribbons, it is generally desirable to distinguish one optical fiber ribbon from another by coloring each of the optical fiber ribbons. Typically, color in a colored optical fiber ribbons is obtained in the same way as color is obtained in a color coated optical fiber. Either the optical fiber ribbon matrix composition is provided with pigments or a polymer dye is used. The same problems mentioned above with respect to colored optical fibers apply to colored optical fiber ribbons.

It is desirable to provide a durable color coating for a telecommunication element, such as an optical fiber, that can withstand the conditions in a typical operational environment that such elements are typically found. The present invention endeavors to provide such a durable coating.

SUMMARY OF THE INVENTION

It is an object of the present invention to provide a colored, radiation curable composition for providing a durable color identifying coating on a transmission medium of a telecommunication element such as an optical fiber.

It is another object of the present invention to provide a telecommunication element which has a color identifying coating whose color does not bleed in the presence of typical cable filing compounds.

It is yet another object of the present invention to provide an optical fiber ribbon having a colored matrix whose color does not bleed in the presence of typical cable filing compounds.

It is one aspect of the present invention to meet the foregoing objectives by providing a telecommunication element having a color identifying coating thereon. The telecommunication element comprises at least one elongated communication transmission medium, and a radiation cured polymeric coating having an identifying color applied on at least a portion of the transmission medium, wherein the identifying color in the polymeric coating is provided by chromophore molecules covalently bonded thereto.

It is another aspect of the present invention to meet the foregoing objectives by providing a colored, radiation curable coating composition for providing a telecommunication element with a color identifying polymeric coating having chromophore molecules covalently bonded thereto. The coating composition comprises a radiation curable composition capable of forming a polymeric coating, and a colored oligomer having chromophore molecules covalently bonded thereto and wherein the colored oligomer is capable of covalent bonding with the radiation curable composition.

It is yet another aspect of the present invention to meet the foregoing objectives by providing a method for producing a color identifying polymeric coating having chromophore molecules covalently bonded thereto on at least a portion of a transmission medium of a telecommunication element. The method comprises the steps of: providing a transmission medium; providing a colored, radiation curable coating composition comprising a radiation curable composition capable of forming a polymeric coating and a colored oligomer having chromophore molecules covalently bonded thereto and wherein the colored oligomer is capable of covalent bonding with the radiation curable composition; applying the coating composition to at least a portion of the transmission medium; and exposing the applied coating composition for a suitable period of time to radiation of a suitable wavelength and intensity to cause curing of the coating composition into the color identifying polymeric coating.

The invention will be more fully understood when reference is made to the following detailed description taken in conjunction with the accompanying drawings.

BRIEF DESCRIPTION OF THE DRAWINGS

The drawings, not drawn to scale, include.

DETAILED DESCRIPTION OF THE PRESENT INVENTION

Color Coated Optical Fibers

Figure 1A:
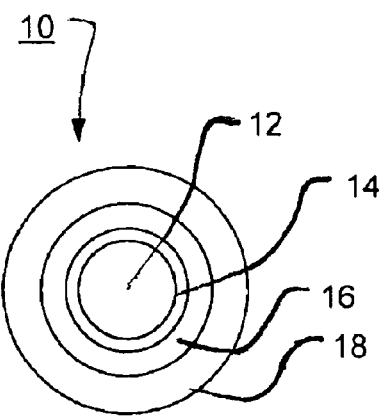
FIG. 1A, which is a cross-sectional view of an optical fiber coated with a primary and secondary coatings.

Typical telecommunications elements include an elongated transmission medium such as a metallic wire or an optical fiber. Referring to FIG. 1A, a typical optical fiber 10 transmission medium is shown. The typical optical fiber 10 is formed by a glass core 12 which is surrounded by a glass cladding 14. The glass cladding 14 of the optical fiber 10 is usually surrounded by one or more protective polymeric coatings. For example, as shown in FIG. 1A, an inner protective polymeric coating 16 covers at least a portion of the cladding 14 and an outer protective polymeric coating 18 typically covers at least a portion of the inner coating 16. The inner 16 and outer 18 protective coatings may also be referred to as inner primary and outer primary coatings or primary and secondary coatings. The inner coating 16 is usually obtained by applying a radiation curable (polymerizable) composition capable of forming a polymeric coating upon curing over the cladding 14. The radiation curable composition is normally applied by passing the optical fiber through a first die or a coating applicator using techniques well known in the art, and therefore, not described herein. Once the radiation curable composition is applied over the cladding 14, the composition may be cured by exposing it to radiation, such as ultraviolet radiation, electron beam radiation or ionizing radiation, to initiate curing (polymerization) thereof. Ultraviolet radiation is most commonly used. The application and curing of the radiation curable composition to form the inner coating 16 may be followed by the application and curing of another radiation curable composition capable of forming a polymeric coating which forms the outer coating 18. This sequence is known as a wet-on-dry application of the outer coating 18. Alternatively, the application of the radiation curable composition which forms the inner coating 16 may be directly followed by the application of a radiation curable composition forming the outer coating 18 prior to exposure to the curing radiation. This is known in the art as a wet-on-wet application. Each application technique is well known in the art.

A typical radiation curable composition capable of forming a polymeric coating for the inner 16 and outer 18 coatings usually includes an acrylated urethane oligomer, which is a reaction product of a hydrocarbon polyol, an aliphatic polyisocyanate and an endcapping monomer such as a hydroxyalkylacrylate or a hydroxyalkylmethacrylate. These typically have monofunctionality, difunctionality or trifunctionality. Other materials, such as photo-initiators, reactive diluents and organofunctional silane adhesion promoters may be included in the radiation curable composition to tailor the physical properties of the coating to meet specific end-use application requirements, such as to provide good thermal, oxidative and hydrolytic stability as well as a soft, compliant, low glass transition temperature-type coating. A discussion of radiation curable primary and secondary coating compositions may be found in U.S. Pat. No. 5,146,531, which is incorporated in its entirety herein by reference.

According to the present invention, the uncolored radiation curable composition that is applied over the cladding and cured to form the inner coating 16 may be colored, if desired, by adding to the composition colored radiation curable oligomers containing chromophore molecules that are covalently bonded thereto. Typical chromophore molecules include anthraquinones, methiones and azo compounds which can provide the three primary colors (blue, yellow and red). The covalent bonding of the chromophore molecules to radiation curable oligomers may be obtained by reacting functional or reactive dyes having the chromophore molecules covalently bonded thereto with the uncolored radiation curable composition. The colored radiation curable oligomers generally have end groups or side groups that make them radiation curable and capable of covalent bonding with other oligomers. When exposed to radiation, these groups covalently bond with other similar groups in the radiation curable composition. For example, the radiation curable composition may have acrylate groups, vinyl groups or epoxy groups. The dye may be functionalized with any end group that may be reacted to covalently bond with another molecule or series of molecules in the radiation curable composition that eventually incorporate the above mentioned radiation curable end group or side group. The functional dye could be a polyol having hydroxy functionality containing a covalently bonded chromophore molecule or the functional dye may have ester or carboxy functionality in addition to the hydroxy functionality described above. Thus, by reacting the reactive or functional dye, containing the covalently bonded chromophore molecules, with oligomers present in the radiation curable composition, the chromophores become incorporated into the backbone of the radiation curable oligomer by way of covalent bonds, and ultimately in the cured coating.

As a general example for forming a colored oligomer for providing a radiation cured polymeric colored coating capable of identifying a telecommunications element, a polyol reactive dye containing hydroxy end groups covalently bonded to a chromophore molecule is provided, in addition to, or in place of, some or all of the typical hydrocarbon polyol that is reacted with an aliphatic polyisocyanate and endcapping monomers to form a typical acrylated urethane oligomer reaction product used in an radiation curable composition for coating optical fibers. Suitable polyol reactive dyes are marketed under the trademark Reactint™ by the Milliken Chemical Company. Those skilled in the art will now recognize that if a sufficient amount of a polyol reactive dye is reacted with aliphatic polyisocyanate, then the resulting acrylated urethane oligomer reaction product will be colored in accordance with the color of the chromophore molecules that are covalently bonded to the oligomer.

Figure 1B:
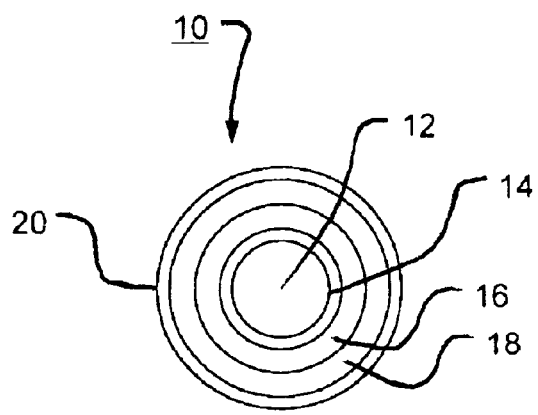
FIG. 1B, which is a cross-sectional view of an optical fiber coated with primary, secondary and tertiary coatings.

The colored, acrylated urethane oligomer may be applied directly to the cladding of the optical fiber as a colored radiation curable composition to form the inner coating 16 or it may be applied directly over a previously applied inner coating as the outer coating 18. Those skilled in the art will recognize that the colored oligomer may also be applied over a previously applied outer coating as a tertiary coating 20, which is illustrated in FIG. 1B. Alternatively, and more commercially advantageous, the colored oligomer may be blended or diluted with a commercially available radiation curable composition typically formulated to provide a protective coating on the optical fiber to form a colored radiation curable composition which is applied over the cladding 14, the inner coating 16 or the outer coating 18 of the optical fiber. Such radiation curable composition may include one or more uncolored aliphatic urethane acrylate oligomers, a reactive diluent, one or more photo-initiators and organofunctional silane adhesion promoters. In other words, the colored radiation curable oligomer described herein may be added, in a quantity sufficient to impart color, to a commercially known, standard, uncolored, radiation curable composition used to provide a protective coating over an optical fiber.

After the radiation curable composition containing the colored oligomer is cured (polymerized) by exposure to radiation of a suitable wavelength and intensity for a suitable period of time, the resulting polymeric coating applied on the cladding 14, the inner 16 or the outer 18 coating of the optical fiber 10, contains chromophore molecules which are covalently bonded thereto. Because the chromophore molecules are covalently bonded to the polymeric coating, the risk of color loss due to bleeding is negligible. Thus, the manufacturing advantages that a dye provides over pigments, particularly application and curing speed, can be obtained while avoiding the bleeding disadvantages that a dye which is not covalently bonded to the polymeric coating may have when used in an optical fiber environment.

To provide a further detailed description of the invention, several examples are provided. Several synthesis examples for forming colored radiation curable oligomers suitable for use in a radiation curable oligomeric liquid composition for coating optical fibers and for forming optical fiber ribbon matrices are provided hereinafter. Examples of radiation curable oligomeric liquid compositions containing the colored oligomers are also provided.

EXAMPLE 1

Yellow Oligomer 202.89 g of Milliken Reactint™ dye yellow X15 was added dropwise to a mixture of 67.44 g isophorone diisocyanate (IPDI) and dibutyltin dilaurate that had been heated to 40° C. Care was taken that the exothermic reaction did not heat above 45° C. by controlling the addition rate. The total time taken for addition was two hours. After the last addition of IPDI, 200 g of 1,6 hexanediol diacrylate (HDODA) was added as a reactive diluent to lower viscosity along with 4.4 g of inhibitor 2,6-Di-tert-butyl-4-methylphenol. This mixture was maintained at 40° C. for two hours before addition of 35.24 g 2-hydroxyethyl acrylate (HEA) dropwise with the temperature maintained below 50° C. by controlling the rate of addition of HEA. One hour after addition, there was no detectible isocyanate peak at 2270 cm$^{-1}$ as observed by FTIR. The resulting urethane acrylate oligomeric reaction product has a yellow color.

EXAMPLE 2

Blue Oligomer 152.09 g of Milliken Reactint™ dye blue X3LV was added dropwise to a mixture of 101.13 g isophorone diisocyanate (IPDI) and 2.98 g dibutyltin dilaurate that had been heated to 40° C. Care was taken that the exothermic reaction did not heat above 45° C. by controlling the addition rate. The total time taken for addition was two hours. After the last addition of IPDI, 200 g of 1,6 hexanediol diacrylate (HDODA) was added as a reactive diluent to lower viscosity along with 2.03 g of inhibitor 2,6-Di-tert-butyl-4-methylphenol. This mixture was maintained at 40° C. for two hours before addition of 52.96 g 2-hydroxyethyl acrylate (HEA) dropwise with the temperature maintained below 50° C. by controlling the rate of addition of HEA. Two hours after addition, there was no detectible isocyanate peak at 2270 cm$^{-1}$ as observed by FTIR. The resulting urethane acrylate oligomer reaction product has a blue color.

EXAMPLE 3

Black Oligomer 226.67 g of Milliken Reactint dye black X95AB was added dropwise to a mixture of 93.30 g isophorone diisocyanate (IPDI) and 2.74 g dibutyltin dilaurate that had been heated to 40° C. Care was taken that the exothermic reaction did not heat above 45° C. by controlling the addition rate. The total time taken for addition was about two hours. After the last addition of IPDI, 200 g of tetrahydrafuran (THF) solvent was added as a reactive diluent to lower viscosity along with 2.38 g of inhibitor 2,6-Di-tert-butyl-4-methylphenol. This mixture was maintained at 40° C. for two hours before addition of 48.78 g 2-hydroxyethyl acrylate (HEA) dropwise with the temperature maintained below 50° C. by controlling the rate of addition of HEA. Two hours after addition, there was no detectible isocyanate peak at 2270 cm$^{-1}$ as observed by FTIR. The THF solvent was then removed via rotovap vacuum technique at room temperature over a 10-hour period until a weight equal to the original inputs (minus the solvent) was reached. The resulting urethane acrylate oligomer reaction product has a black color.

Several liquid coating compositions employing the colored radiation curable oligomers are described hereinafter.

EXAMPLE 4

Yellow Colored Optical Fiber Outer Coating Composition

A yellow ultraviolet radiation curable coating composition for providing a colored outer coating was made by combining 60 weight percent Ebecryl™ 4827, which is an aromatic urethane diacrylate oligomer having a molecular weight of about 1500 sold by UCB Chemicals, 30 weight percent trimethylolpropane trimethacrylate (TMPTA) sold by UCB Chemicals, which is a reactive diluent, 6 weight percent of the yellow colored urethane acrylate oligomer reaction product of the synthesis described in Example 1 and about 4 weight percent of Darocure™ 4268 which is a photo-initiator. The coating composition was applied on an inner coating layer and cured by exposing the composition to ultraviolet radiation in a suitable wavelength range and intensity to form a yellow colored outer protective polymeric coating.

EXAMPLE 5

Blue Colored Optical Fiber Inner Coating Composition

A blue ultraviolet radiation curable coating composition for providing a colored inner coating was made by combining 60 weight percent Ebecryl™ 230, which is a high molecular weight aliphatic urethane diacrylate oligomer (bulk oligomer) sold by UCB Chemicals, 29 weight percent beta-carboxyethyl acrylate (β-CEA) sold by UCB Chemicals, which is a monofunctional reactive diluent, 6 weight percent of the blue colored urethane acrylate oligomer reaction product of the synthesis described in Example 2 and about 5 weight percent of Darocure™ 4265, which is a photo-initiator. The coating composition was applied on the cladding of an optical fiber and cured by exposure to ultraviolet radiation in a suitable wavelength range and intensity to form a blue colored inner protective coating.

EXAMPLE 6

Blue Colored Optical Fiber Outer Coating Composition

A blue ultraviolet radiation curable coating composition for providing a colored outer coating was made by combining 60 weight percent Ebecryl™ 4827 (bulk oligomer), 30 weight percent TMPTA (reactive diluent), 6 weight percent of the blue colored urethane acrylate oligomer reaction product of the synthesis described in Example 2 and about 4 weight percent of Darocure™ 4268. The coating composition was applied to the inner coating of an optical fiber to form a blue colored outer protective polymeric coating after curing by exposure to ultraviolet radiation in a suitable wavelength range.

EXAMPLE 7

Blue Colored Ink (Tertiary) Coating Composition

A blue ultraviolet radiation curable coating composition for providing a colored tertiary coating was made by combining 25 weight percent Ebecryl™ 4866, which is an aliphatic urethane triacrylate diluted with 30 weight percent tripropylene glycol diacrylate (TRPGDA) sold by UCB Chemicals, 25 weight percent TMPTA (a reactive diluent), 35 weight percent of the blue colored urethane acrylate oligomer reaction product of the synthesis described in Example 2, 10 weight percent hexanediol diacrylate (HDODA) (a reactive diluent) and about 5 weight percent of Darocure™ 4268. The coating composition was applied over the outer coating of an optical fiber and cured by exposure to ultraviolet radiation in a suitable wavelength range to form a blue colored tertiary protective polymeric coating.

EXAMPLE 8

Blue Oligomer 11.16 g of isophorone diisocyanate and 0.35 g of dibutyltin dilaurate was heated to 50° C. 16.34 g of 1,5-bis ((3-hydroxy-2,2-dimethylpropyl) amino)-9,10-anthracenedione was mixed with THF to get the anthracenedione into solution and added slowly to the reaction. The reaction temperature was maintained at 50° C. for three hours. The temperature was reduced to 40° C. and 0.25 g of 2,6-Di-tertbutyl-4-methylphenol and 30 g of 1,6 hexanediol diacrylate was added to the reaction. 5.819 g of 2-hydroxyethyl acrylate was then added dropwise. The reaction was run to completion by measuring the isocyanate peak at 2270 $cm^{-1}$ by FTIR. The THF was evaporated off of the mixture. The resulting urethane acrylate oligomer was blue in color.

EXAMPLE 9

Blue Colored Optical Fiber Outer Coating

A blue ultraviolet radiation curable coating composition for providing a colored outer coating was made by combining 65 weight percent of Ebercryl™ 4827, which is a urethane acrylate oligomer (bulk oligomer), 30 weight percent tripropylene glycol diacrylate (TPGDA), which is a reactive diluent, 1 percent of the blue colored urethane acrylate oligomer reaction product of the synthesis described in Example 8 and about 4 percent of Darocure 4268 which is a photo-initiator. The coating composition was applied to an inner coating layer and cured by exposing the coinposition to ultraviolet radiation at a suitable wavelength range to form a blue colored outer protective polymeric coating.

EXAMPLE 10

Blue Colored Optical Fiber Inner Coating

A blue ultraviolet radiation curable coating composition for providing a colored inner coating was made by combining 65 weight percent of Ebercryl™ 230 which is a urethane acrylate oligomer, 29 weight percent β-CEA monofunctional reactive diluent, 1 percent of the blue colored urethane acrylate oligomer reaction product of the synthesis described in Example 8 and about 5 weight percent Darocure 4265, which is a photo-initiator. The coating composition was applied to the cladding of an optical fiber and cured by exposure to ultraviolet radiation in a suitable wavelength range to form a blue colored inner protective fiber coating.

Colored Optical Fiber Ribbon

Figure 2:
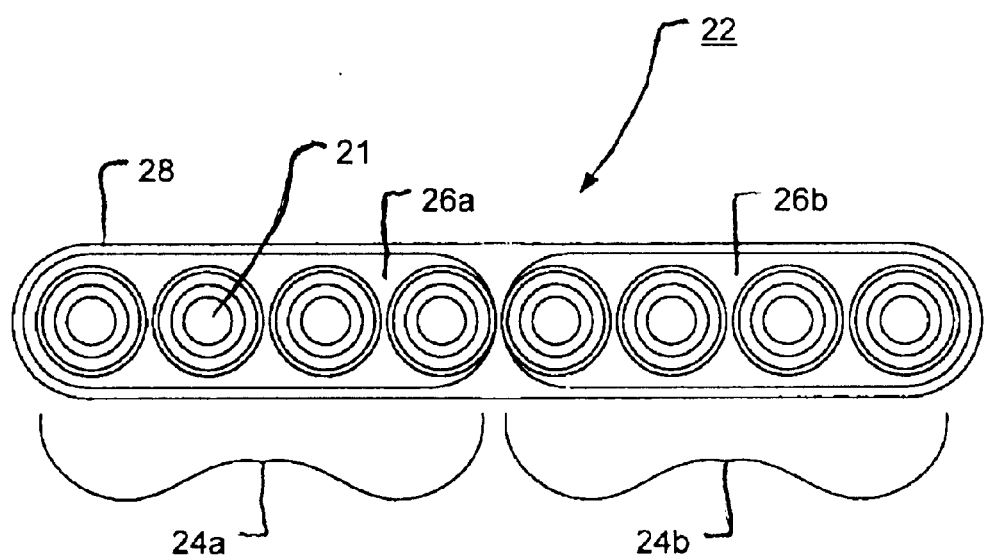
FIG. 2, which is a cross-sectional view of a splittable optical fiber ribbon containing at least one colored matrix.

Referring to FIG. 2, there is shown a typical splittable optical fiber ribbon 22 containing two planar arrays 24a, 24b of optical fibers 21. Each of the arrays of optical fibers are enveloped by a primary matrix 26a, 26b that hold the fiber arrays together. Both primary matrices 26a, 26b are enveloped by a secondary matrix 28. The primary matrices 26a, 26b, the secondary matrix 28 or both may be colored in accordance with the present invention. An example of a colored matrix is described below.

EXAMPLE 11

Blue Ribbon Matrix

A composition for forming a blue colored optical fiber ribbon matrix was made by combining 6 weight of the blue oligomer described in Example 2, 60 weight percent Ebecryl™ 4866 trifunctional oligomer (bulk oligomer), 30 weight percent TMPTA (reactive diluent) and 4 weight percent Darocurel™ 4268 photo-initiator. The resulting composition was applied over a planar array of optical fibers using ordinary application methods with a die or an applicator. The composition was cured by exposure to ultraviolet radiation in a suitable wavelength range to form a blue colored matrix over the planar array of optical fibers.

As shown above, the present invention provides a durable color identifying coating for a telecommunication element such as an optical fiber or an optical fiber ribbon. The embodiments disclosed herein admirably achieve the objects of the present invention; however, it should be appreciated by those skilled in the art that departures can made by those skilled in the art without departing from the spirit and scope of the invention which is limited only by the following claims.

What is claimed is:

1. A telecommunication element comprising an elongated communication transmission medium at least partially coated with a colored, radiation cured polymeric coating, wherein said polymeric coating is obtained by a process comprising radiation curing a composition comprising a radiation curable oligomer, wherein said oligomer has at least one chromophore molecule covalently bound thereto, whereby said chromophore molecule provides an identifying color to said medium.

2. The telecommunication element of claim 1, wherein the elongated communication transmission medium is an optical fiber having a core and a cladding surrounding the core.

3. The telecommunication element of claim 1, wherein the elongated communication transmission medium is an optical fiber having a core, a cladding surrounding the core and a polymeric coating on the cladding.

4. The telecommunication element of claim 1, wherein the elongated communication transmission medium is an optical fiber having a core, a cladding surrounding the core, an inner polymeric coating on the cladding and an outer polymeric coating on the inner polymeric coating.

5. The telecommunication element of claim 1, wherein the elongated communication transmission medium is a plurality of optical fibers arranged in an array.

6. A colored, radiation curable coating composition comprising
a radiation curable oligomer which forms a polymer upon radiation curing, wherein said oligomer has at least one chromophore molecule covalently bound thereto.

7. The composition of claim 6, wherein the colored oligomer comprises approximately 0.1 to 60 weight percent of the composition.

8. The composition of claim 6, wherein the composition further comprises an aliphatic urethane acrylate component.

9. The composition of claim 8, wherein the composition further comprises a reactive diluent component.

10. The composition of claim 9, wherein the reactive diluent component comprises up to 30 weight percent of the composition.

11. The composition of claim 8, wherein the composition further comprises a photo-initiator.

12. The composition of claim 11, wherein the photo-initiator comprises up to 10 weight percent of the composition.

13. The telecommunication element of claim 1, wherein said at least one chromophore molecule comprises an anthraquinone.

14. The telecomumcation element of claim 1, wherein said at least one chromophore molecule comprises a methione.

15. The telecommunication element of claim 1, wherein said at least one chromophore molecule comprises an azo compound.

* * * * *